J. T. BLOIS.
Railway Car Brake.
No. 89,014.
Patented April 20, 1869.
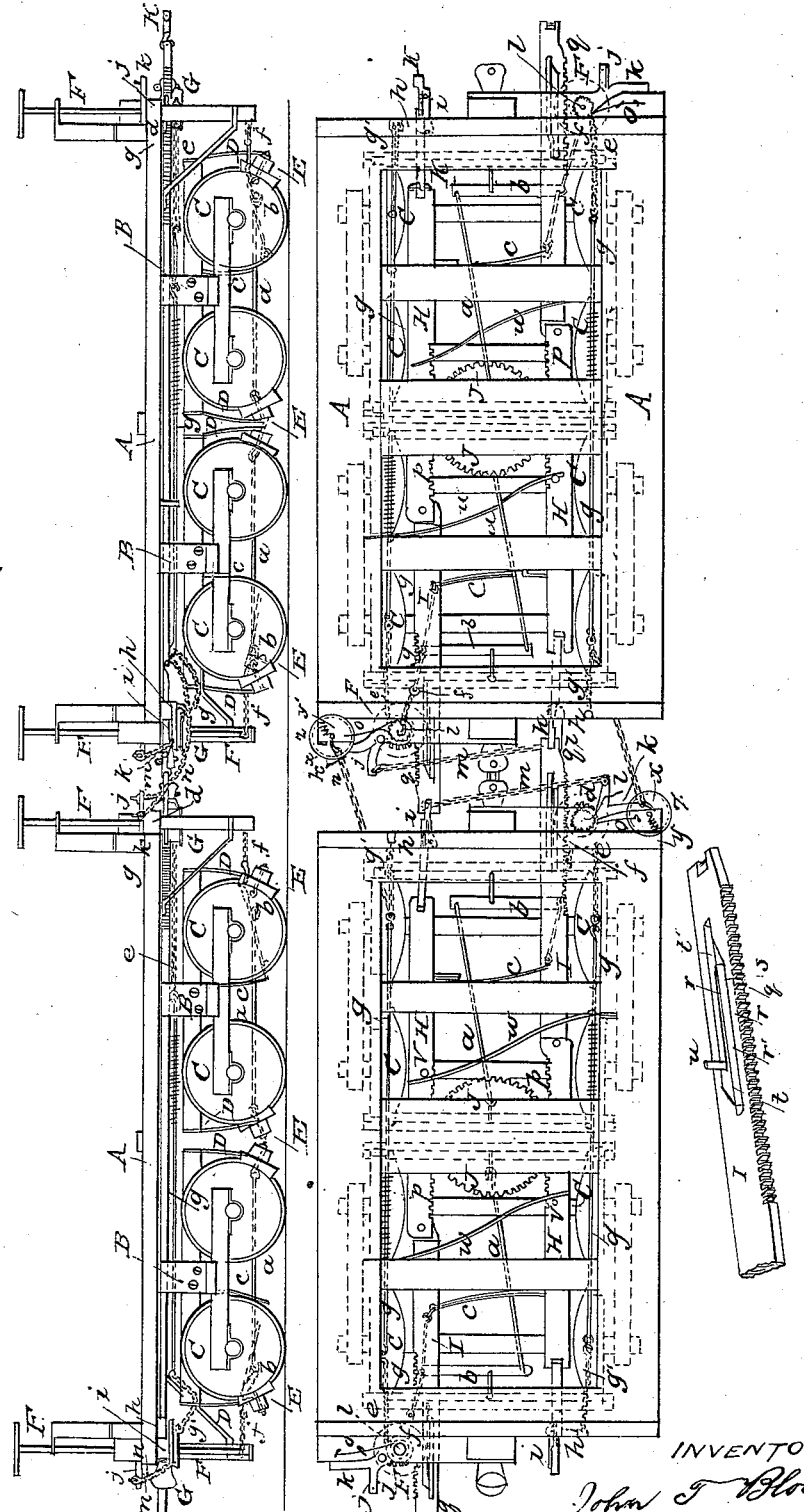
WITNESSES
INVENTOR
John T Blois

UNITED STATES PATENT OFFICE.

JOHN T. BLOIS, OF JONESVILLE, MICHIGAN.

Letters Patent No. 89,014, dated April 20, 1869.

IMPROVED RAILWAY-CAR BRAKE.

The Schedule referred to in these Letters Patent and making part of the same.

*To all whom it may concern:*

Be it known that I, JOHN T. BLOIS, of the village of Jonesville, in the county of Hillsdale, and State of Michigan, have invented a new and improved Railroad-Car Brake; and I do hereby declare the following to be a full and correct description of the same, sufficient to enable others skilled in the art to which my invention appertains, to fully understand and use the same, reference being had to the accompanying drawings, which make part of this specification, and in which—

Figure 1 is a side elevation.

Figure 2, a top or plan view of my improved railroad-car brake-device.

Figure 3, a detached view of a part of the same.

Like letters of reference indicate like parts in the three figures.

In fig. 1, the device is shown with the brakes set. In fig. 2, it is shown with the brakes raised from the wheels.

I call my improved brake "The Lightning Brake," as any accident deviating any car from its proper line on the track instantly releases a pawl, and sets the brake on all the cars on the train, and, as it can be instantly set on all the cars on a train from any one of them, or from the cab of the engineer, at a moment's notice, by merely releasing a pawl.

The brake-power consists of a spring or springs, acting upon and in combination with the common lever car-brake, reversed.

This brake is operated in precisely the reverse manner from the common brake, and when thus operated, the brake is released from the wheels, while in common brake-devices, this operation sets the brakes on the wheels.

This brake, on any particular car, can be set or released by operating the brake-staffs on it.

The devices for braking and releasing the brake on the different cars are so connected with and to each other, that the brakes of all the cars of a train can be set from any one of them, or from the cab of the engineer, and the engineer, in his place, by using the engine, or any other sufficient power, can immediately release the brakes again.

Device for Braking.

A, in the drawings, may represent car-platforms resting on trucks B, provided with wheels C.

To the ends of these trucks B are attached elliptic or partly-elliptic springs D, the lower ends of which support and hold the brakes E, lightly, from the wheels C.

To the centre of the inner brake-beam L is fastened a rod, $a$, connected, at its other end, to the shorter arm of a lever, $b$, pivoted to the centre of the outer brake-beam T.

The longer arm of the lever $b$ is attached to the free end of an elliptic or partly-elliptic spring, $c$, of great power, which is secured to the cross-beam of the trucks, at Q.

The longer arm of the lever $b$ is also connected to the lower end of the brake-staff F by means of a rod and chain, $f$.

Secured on the brake-staff F, just below the platform A, is a drum, G, the upper rim of which is formed into a toothed wheel, $d$.

One end of a chain, $e$, is so attached to the drum G, that when the brakes are up from the wheels the chain is unwound from the drum, the point of its attachment to the drum being in right line with the rod and chain, in order that when the brakes are sprung upon the wheels, and the chain $f$ unrolls from the brake-staff F, the chain $e$ winds around the drum in a reverse direction, and pulls the rod $g$, attached to the chain $e$, a distance equal to the circumference of the drum.

The other end of the rod $g$ is, by means of a chain, $g'$, attached to one arm, $h$, of a right-angular dog, secured under the platform A, at the end opposite to that under which the drum G is situated.

This arm $h$ is in position parallel with the end of the platform, while the other end, $i$, of the dog is at right angles with arm $h$ and the end of platform A, projecting out from under the latter.

This arm $i$ connects, by means of a chain, $m$, with an arm, $j$, of a pawl, situated on the platform A above the drum G, and catching in the teeth of a ratchet-wheel, $l$, on the brake-staff F.

The arm $j$ of the pawl is parallel with the arm $i$ of the dog, while the arm $k$ runs parallel with the arm $h$.

The arm $k$ is again connected with the rod $g$ on the next car by a chain, $n$.

A spiral spring surrounding the rod $g$ is attached at one end of the same, and with the other to the under side of the platform, in such a manner that sufficient spring is obtained to allow the chain $e$ to go once around the drum, and so recoil back sufficiently to keep the chain taut to the drum.

A straight spring, $o$, bears against the point or tooth of the pawl, and keeps the same against the ratchet-wheel $l$.

The ends of the chains $m$ and $n$, which attach to the pawl-arms $j$ and $k$, are provided with rings, which slip over pins or hooks on said pawl-arms, so as to be readily detached from or attached to the pawl.

Device for Raising the Brakes from the Cab of the Engineer.

In proper bearings on the under side of each side of the platform A are slide-jointed rack-bars H I.

The bars H have racks $p$ on their inner sides, which mesh in the teeth of a toothed wheel, J, secured to the centre of the under side of the platform A, while the bars I have racks $q$ on their outer sides, and mesh in the teeth of wheels $d$ on the drums G.

Bars H and I, of the same side, on adjoining cars, are connected by means of double-hinged connecting-bars K, which allow sufficient play of the cars without disturbing the connection.

The bars I have, on the surface of their outer ends, a double groove, $r\ r'$, each groove having a rounded inner end, the outer end of each other groove projecting a little beyond it.

These grooves are separated from each other by a ridge, $s$, each end of which is provided with a straight spring, $t\ t'$, in such a manner that a pin, $u$, attached to the under side of frame A, can pass through the grooves $r$, inwardly passing the spring $t$, but cannot retrace its way in groove $r$, but must pass through groove $r'$, and thence again into groove $r$, passing the other spring, $t'$. I speak figuratively, for, in reality, the pin is stationary, and the grooves pass around it.

Thus, in removing the brakes from the wheels, by the engineer, the pin U travels in groove $r$, as the bars H I are operated from the engine, (the wheels J moving the opposite bars,) and the racks $q$, in turning the drum G, by means of the toothed wheels $d$, operate the brakes.

As soon as the pin $u$ has passed the spring $t$, the racks $q$ are forced away from the wheels $d$, which are held by the pawls; the pin $u$ now travelling in the groove $r'$, and the bars H I are forced back to their original position by means of springs $w$, secured to the cross-bars of the platform A, and operating against pins $v$ on the bars H.

A rule to be observed in connecting the cars is, that chain $n$, connecting from rod $g$ to pawl-arm $k$, has sufficient length, when the train is on the stretch, not to disturb the pawl $k$ by any sway of the cars; and the drum G is of sufficient size, when the brakes are sprung, set, and the cars are crowded close together, to barely release the point of pawl K from the teeth of ratchet-wheel $l$.

Another rule to be observed is, that the angle separating the teeth of ratchet-wheel $l$ is obtuse, and into which the point of the pawl exactly fits.

The spring $o$ has sufficient stiffness to hold the point of the pawl $j\ k$ firmly in the teeth of the ratchet-wheel $l$, against any ordinary jolt or jar of a rough track.

Connection, by chain, from the end of jointed bar I of the forward car, with the engine or other sufficient power, under the engineer's control, also a connection, by rope or chain, from the end of pawl $k$, on the front of the forward car, running to the engineer's cab, having been made, and the devices aforesaid, on the different cars, connected, and the brakes removed from the wheels, the train is free to move on.

Operation.

If the engineer, in an emergency, wishes to stop the train immediately, he springs the rope attached to pawl $k$, on the forward car, and all the brakes on the whole train are immediately set thereby.

If the conductor sees an emergency requiring an immediate stop, he releases pawl $k$, on any car on the train, and all the brakes on the train are immediately set thereby.

If an axle or rail breaks, or any other accident happens to a car, by means of which it is jostled from its track, the brakes on the whole train are instantly set thereby.

In the latter case, whether the car is jostled to the right or to the left of the track, it is obvious that chain $n$ will instantly tauten, and pull pawl $k$ from the ratchet-wheel $l$.

The wheel $l$ being released, the spring $c$ unwinds the chain $f$ from the brake-staff F, which revolves the drum G, and thus winds up the chain $e$, pulling the rod $y$, and with it the arm $k$ of the pawl on the next car, releasing it, and also the arm $h$ of the dog, by means of chain $g'$.

The arm $i$ of the dog, of necessity, follows the movement of the arm $h$, and releases the pawl on the opposite side of the car, by pulling its arm $j$, by means of chain $m$, and so on from car to car.

It is apparent that the same effect is produced in every case of releasing pawl K from the wheel $l$, whenever the brakes are raised from the wheels.

Rule to be Observed by the Engineer in Raising the Brakes.

When all the brakes have been set, by an emergency or otherwise, and the proper connections made, the train is stretched by the movement of the locomotive forward, and with the same movement the brakes are lifted by the engineer, from the wheels, by operating the bars H I, from the engine or other suitable power, as aforesaid; but this power must never be applied to raise the brakes, when the brakes are already raised from the wheels, nor unless the train is on the stretch, as a violation of this rule will break the operating-machinery.

The brakes can also be raised separately by the brakemen, in operating the brake-staves, whether the train is on the stretch or not, whenever the racks $q$ are detached from the wheels $d$.

Should it be desired to brake up but one car, it can be done by removing the rings of the chains $m$ and $n$ from the pins on the arms $j$ and $k$ of the pawls on that car, when the brakes of only the disconnected car are set, by the brakeman operating the brake-staves upon the detached car.

The brakes are again removed from the wheels by the brake-staff F, in the manner described, the chains $m$ and $n$ again connected to the pawls, and the connection of the brakes of the whole train is again complete.

The bars H I may be operated from the engine in any suitable manner.

Should it be desired to attach my brake to freight-cars, I have fixed the following device to remove the pawl from the ratchet-wheel, by a brakeman standing on the roof of the car; that is to say—

I put another iron staff, of a length reaching above the roof of the car, and similar to a brake-staff, near the end of the arm of the pawl K, through the lower end of which staff passes a hooked-shaped end, $x$, of a spiral spring, which is fastened to the side of the platform or end of the car, as shown at $y$.

The hooked end, $x$, is so arranged that by turning the staff to the right, it is brought in contact with a pin on the pawl K, and releases it from the wheel $l$, and sets the brakes, after which the spiral spring recoils back into its place, and leaves the pawl free.

There is no need of dwelling upon the advantages of such instantaneous brake-device as mine, as they are too apparent to need much comment.

Having thus described my invention,

What I claim as new, and desire to secure by Letters Patent, is—

1. The device for connecting the brakes of the different cars of a railroad-train to each other, consisting of pawls $j\ k$, dogs $i\ h$, rods $g$, chains $g'$, $m$, $n$, and $e$, drum G, ratchet-wheel $l$, and brake-staff F, substantially as and for the purposes set forth.

2. In combination with the above, the rod and chain $f$, lever $b$, rod $a$, and spring $c$, substantially as and for the purposes described.

3. The device for removing the brakes from the wheels of the cars upon a railroad-train, from the locomotive, consisting of the jointed rack-bars H I, connected to each other by hinged bars K, toothed wheels J and d, racks p and q, springs w, and pins v, substantially as described.

4. The device for disconnecting the bars I from the toothed wheel d on the brake-staves, consisting of grooves r r', partition s, springs t t', and pin u, substantially as described.

5. The additional iron staff Z, provided with spring x, substantially as and for the purposes set forth.

JOHN T. BLOIS.

Witnesses:
   E. O. GROSVENOR,
   JONATHAN B. GRAHAM.